US012589977B2

(12) United States Patent (10) Patent No.: US 12,589,977 B2
Wu et al. (45) Date of Patent: Mar. 31, 2026

(54) APPARATUS FOR INFORMATION COLLECTION, CARGO HANDLING METHOD, AND MONITORING SYSTEM

(71) Applicant: EFFITO PTE. LTD., Singapore (SG)

(72) Inventors: Longfei Wu, Shenzhen (CN); Mu Fang, Shenzhen (CN); Jianhui Yang, Shenzhen (CN)

(73) Assignee: EFFITO PTE. LTD., Singapore (SG)

( * ) Notice: Subject to any disclaimer, the term of this patent is extended or adjusted under 35 U.S.C. 154(b) by 120 days.

(21) Appl. No.: 18/317,975

(22) Filed: May 16, 2023

(65) Prior Publication Data

US 2023/0365384 A1 Nov. 16, 2023

(30) Foreign Application Priority Data

May 16, 2022 (CN) .......................... 202221172655.3

(51) Int. Cl.
| | |
|---|---|
| *B66F 9/06* | (2006.01) |
| *B66F 9/075* | (2006.01) |
| *H04N 23/50* | (2023.01) |
| *H04N 23/51* | (2023.01) |
| *H04N 23/695* | (2023.01) |

(52) U.S. Cl.
CPC ............ *B66F 9/063* (2013.01); *B66F 9/0755* (2013.01); *H04N 23/50* (2023.01); *H04N 23/51* (2023.01); *H04N 23/695* (2023.01)

(58) Field of Classification Search
CPC ......... B66F 9/063; B66F 9/0755; G06N 5/02;
G06Q 2240/00; G06Q 10/08; G06Q 10/02; G01S 7/481; G01S 17/86; G01S 17/88; H04N 23/51; H04N 23/50; H04N 23/695
See application file for complete search history.

(56) References Cited

U.S. PATENT DOCUMENTS

| | | | | |
|---|---|---|---|---|
| 5,786,854 | A | * | 7/1998 | Slade ..................... F16M 11/18 |
| | | | | 396/419 |
| 6,344,872 | B1 | * | 2/2002 | Bresee ..................... D06H 3/08 |
| | | | | 348/88 |

(Continued)

FOREIGN PATENT DOCUMENTS

| | | |
|---|---|---|
| CN | 209023571 U | 6/2019 |
| CN | 111493755 A | 8/2020 |

(Continued)

OTHER PUBLICATIONS

EP23173442.7—Extended European Search Report mailed on Sep. 29, 2023, 8 pages.

(Continued)

*Primary Examiner* — Chiawei Chen
(74) *Attorney, Agent, or Firm* — Getech Law LLC; Jun Ye

(57) ABSTRACT

An apparatus for information collection, a cargo handling method, and a monitoring system are provided in the present disclosure. The apparatus for information collection at least includes an information collecting body and a first adjusting mechanism. The information collecting body is configured to collect information of a cargo and/or a truck. The information collecting body is mounted at the first adjusting mechanism. The first adjusting mechanism is configured to drive the information collecting body to rotate around an axis.

14 Claims, 9 Drawing Sheets

(56)     References Cited

U.S. PATENT DOCUMENTS

| | | | | |
|---|---|---|---|---|
| 8,157,500 | B1 * | 4/2012 | Husmann | B66F 9/0755 |
| | | | | 414/642 |
| 11,287,251 | B2 * | 3/2022 | Stieff | G01M 17/06 |
| 11,536,857 | B2 * | 12/2022 | Best | G01C 15/06 |
| 11,794,664 | B2 * | 10/2023 | Kim | B60R 11/04 |
| 2003/0094495 | A1 * | 5/2003 | Knowles | G02B 26/10 |
| | | | | 235/462.14 |
| 2016/0269647 | A1 * | 9/2016 | Kim | H04N 7/183 |
| 2017/0297589 | A1 * | 10/2017 | Zhou | F16H 1/16 |
| 2018/0370780 | A1 * | 12/2018 | Marsee | B66F 9/0755 |
| 2020/0324700 | A1 * | 10/2020 | Asfaw | H04N 23/90 |
| 2021/0101278 | A1 * | 4/2021 | Mozeika | B62D 55/065 |
| 2021/0223034 | A1 * | 7/2021 | Stieff | G01M 17/06 |
| 2022/0155063 | A1 * | 5/2022 | Cejka | G01B 11/272 |
| 2022/0214517 | A1 * | 7/2022 | Sanchez | G02B 7/021 |
| 2023/0291984 | A1 * | 9/2023 | Chandwadkar | F16M 11/425 |
| 2024/0013549 | A1 * | 1/2024 | Xie | G06V 20/56 |
| 2025/0211844 | A1 * | 6/2025 | Cutri | H04N 23/57 |

FOREIGN PATENT DOCUMENTS

| | | |
|---|---|---|
| CN | 212004835 | 11/2020 |
| CN | 112257537 A | 1/2021 |
| CN | 212776388 | 3/2021 |
| CN | 216431144 | 5/2022 |
| KR | 20060019254 A | 3/2006 |
| KR | 20200102868 A | 9/2020 |
| WO | 2020233878 | 11/2020 |

OTHER PUBLICATIONS

JP2023080958—Notice of Reasons for Refusal mailed on Apr. 24, 2024, 12 pages.
KR10-2023-0063133—Request for the Submission of an Opinion mailed on Feb. 26, 2025, 17 pages.
KR 1020230063133—Office Action mailed on Nov. 19, 2025, 15 pages.

* cited by examiner

600

601

620

610

10    10    10    10

P y x 10    10    10    10

APPARATUS FOR INFORMATION COLLECTION, CARGO HANDLING METHOD, AND MONITORING SYSTEM

CROSS-REFERENCE TO RELATED APPLICATION(S)

This application claims priority under 35 U.S.C. § 119(a) to and the benefit of Chinese Patent Application No. 202221172655.3, filed May 16, 2022, the entire disclosure of which is hereby incorporated by reference.

TECHNICAL FIELD

This disclosure relates to the field of cargo handling technology, and in particular to an apparatus for information collection, cargo handling method, and a monitoring system.

BACKGROUND

Due to uncertainties of parking poses of trucks and poses of cargos on the trucks, it is difficult for an unmanned forklift to pick up the cargo according to different parking poses of the truck or different poses of the cargo, resulting in a low unloading efficiency. In some related arts, the truck unloading is usually carried out by a manual forklift. However, in a scenario where a manual equipment docks with the unmanned forklift, uncontrollability of environment is increased due to human participation, such that awareness of the unmanned forklift to the environment and control of the manual equipment over the unmanned forklift are difficult to meet use requirements. In other related arts, unloading requirements of unmanned forklifts are reduced by restricting parking position of the truck and fixing a placement pose and a placement order of the cargo. However, regardless of human participation or changing the poses of the truck and the poses of the cargo, inconvenience will be caused to an unloading process and an overall unloading efficiency will be affected.

SUMMARY

According to a first aspect of the present disclosure, an apparatus for information collection is provided in embodiments of the present disclosure. The apparatus for information collection includes an information collecting body and a first adjusting mechanism. The information collecting body is configured to collect information of a cargo and/or a truck. The information collecting body is mounted at the first adjusting mechanism. The first adjusting mechanism is configured to drive the information collecting body to rotate around an axis.

According to a second aspect of the present disclosure, a cargo handling method is provided in embodiments of the present disclosure. Image information of a target object collecting is collected by a camera, and point-cloud information of the target object is collected by a laser sensor. The image information and the point-cloud information are fused to obtain a fusion result, and pose information of the target object is calculated according to the fusion result. The pose information fed back to a central control dispatching system to dispatch an unmanned forklift to unload or load.

According to a third aspect of the present disclosure, a monitoring system is provided in embodiments of the present disclosure. The monitoring system includes the above apparatus for information collection.

As for the above apparatus for information collection, the information collecting body and the first adjusting mechanism are at least included. By disposing the information collecting body, the information of the cargo and/or the truck can be collected. By disposing the first adjusting mechanism, an angle of the information collecting body can be adjusted. Therefore, the apparatus for information collection can collect information of parking poses of the truck and poses of the cargo from multiple angles, such that information collected by the apparatus for information collection is richer, and an unloading or loading mode of the unmanned forklift can be adjusted according to the information collected, thereby improving an unloading or loading efficiency.

Figure 1:
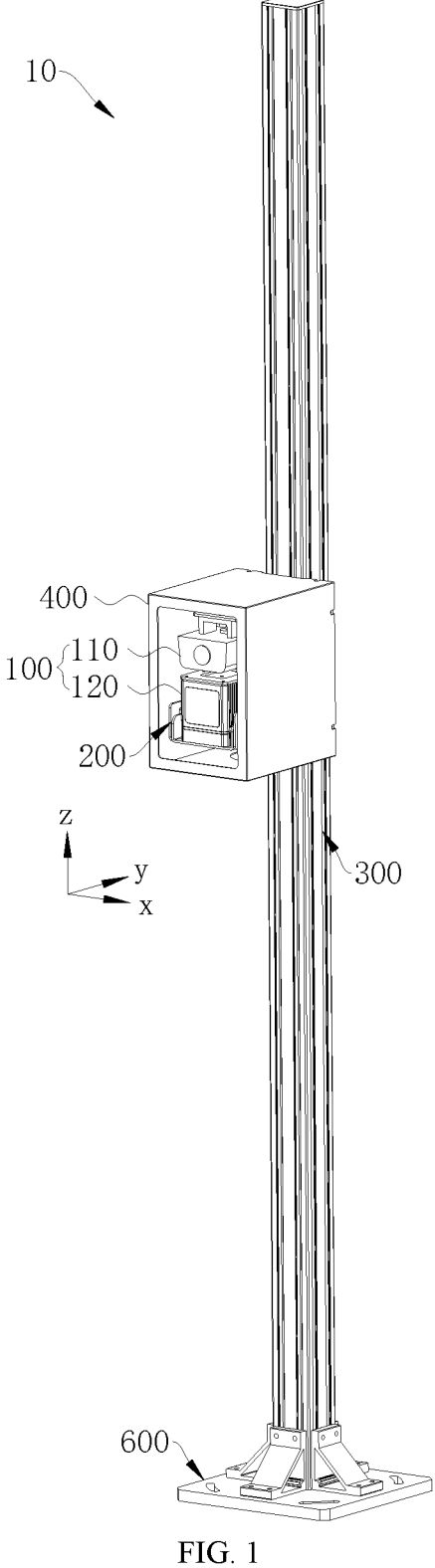
FIG. 1 is a schematic structural diagram of an apparatus for information collection in an implementation of the present disclosure.

REFERENCE SIGNS apparatus 10 for information collection, information collecting body 100, camera 110, laser sensor 120, bracket 130, first adjusting mechanism 200, first mounting member 210, mounting groove 2101, first connecting hole 211, third projection 2111, third connecting hole 212, first projection 2121, bottom wall 210a, first side wall 210b, first end 213, second end 214, second mounting member 220, accommodating space 2201, second connecting hole 221, fourth projection 2211, fourth connecting hole 222, second projection 2221, second side wall 220a, third side wall 220b, first connecting member 230, second connecting member 240, second adjusting mechanism 300, third mounting member 310, guiding member 320, housing 400, first opening 401, second opening 402, accommodating cavity 403, connector 500, mounting seat 600, mounting baseplate 610, support member 620, mounting space 601, axis a, first direction z, second direction y, third direction x, reference plane R, intersection J of axis a and reference plane R, truck parking area P.

DETAILED DESCRIPTION

Figure 2:
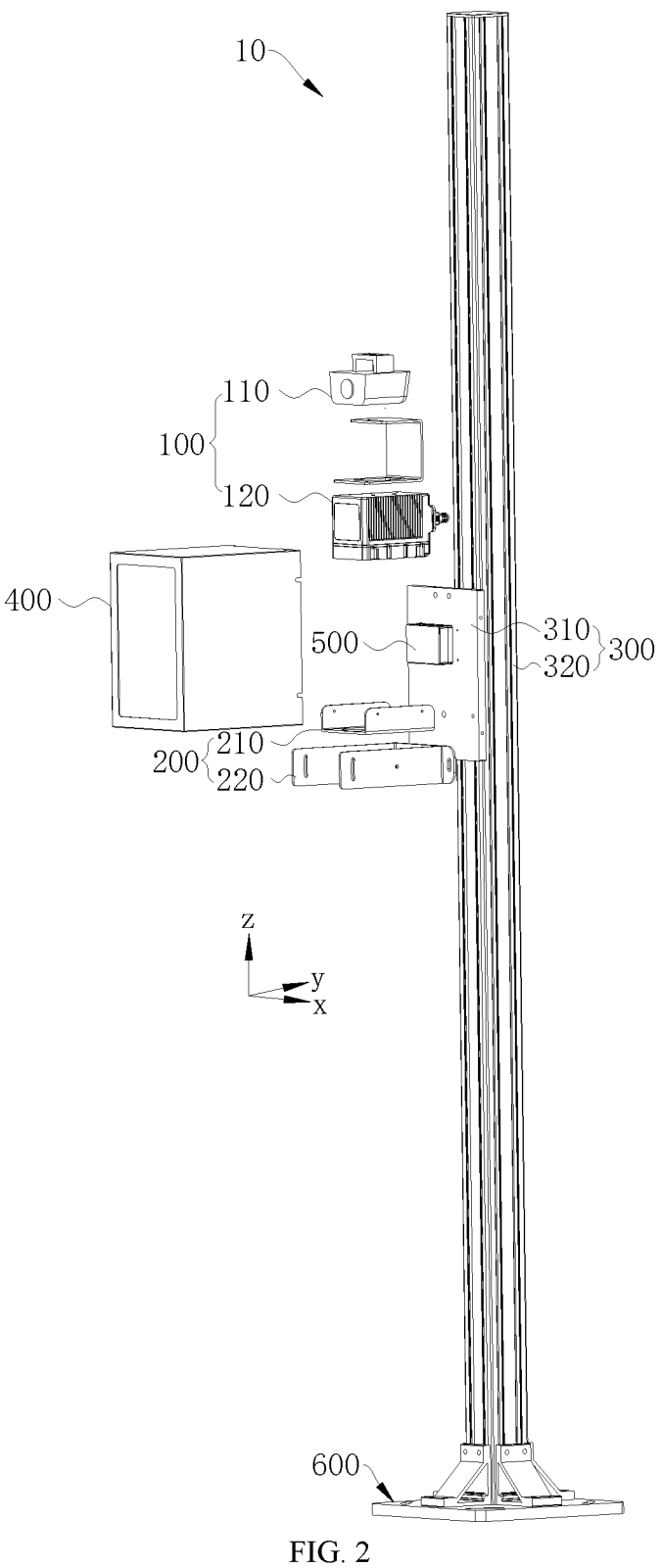
FIG. 2 is a local exploded schematic structural diagram of an apparatus for information collection in an implementation of the present disclosure.
Figure 3:
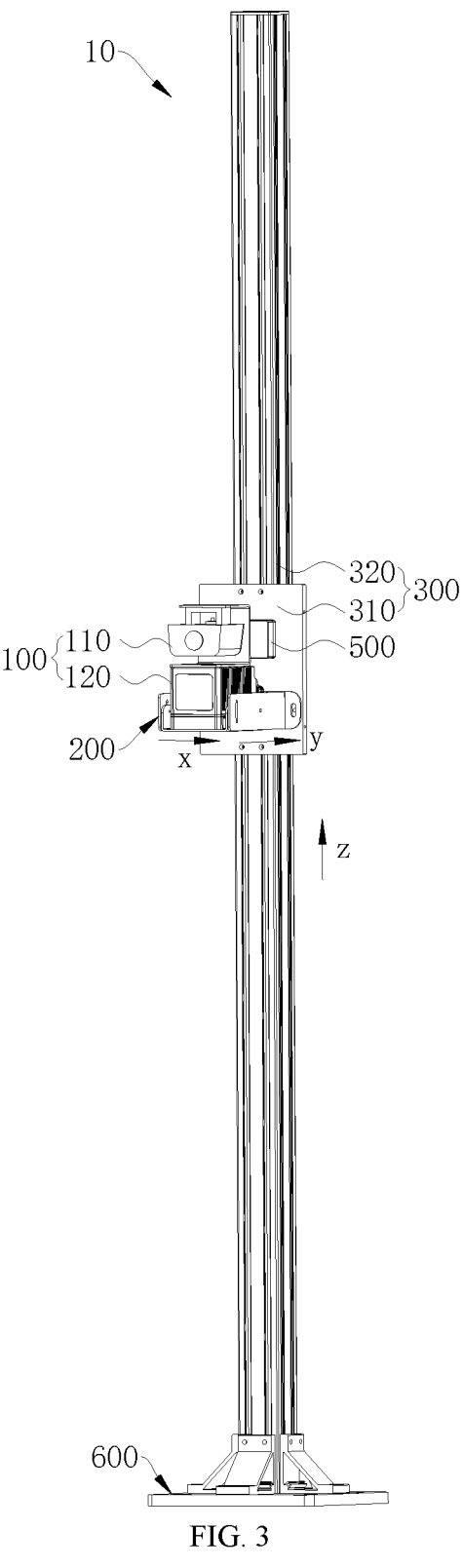
FIG. 3 is a partial schematic structural diagram of an apparatus for information collection in an implementation of the present disclosure.

Reference can be made to FIG. 1 to FIG. 3, where FIG. 1 is a schematic structural diagram of an apparatus 10 for information collection in an implementation of the present disclosure, FIG. 2 is a local exploded schematic structural diagram of an apparatus 10 for information collection in an implementation of the present disclosure, and FIG. 3 is a partial schematic structural diagram of an apparatus 10 for information collection in an implementation of the present disclosure. For convenience of explanation, only parts related to embodiments of the present disclosure are illustrated. For example, a housing 400 illustrated later is removed from FIG. 3.

In some embodiments, an apparatus 10 for information collection is provided in embodiments of the present disclosure. The apparatus 10 for information collection includes an information collecting body 100 and a first adjusting mechanism 200. The information collecting body 100 is configured to collect information of a cargo and/or a truck, to realize identification and positioning of the cargo and/or the truck. The information collecting body 100 is mounted at the first adjusting mechanism 200. The first adjusting mechanism 200 is configured to drive the information collecting body 100 to rotate around an axis a.

In the apparatus 10 for information collection, by disposing the information collecting body 100, the information of the cargo and/or the truck can be collected. By disposing the first adjusting mechanism 200, an angle of the information collecting body 100 can be adjusted. Therefore, the apparatus 10 for information collection can collect information of parking poses of the truck and poses of the cargo from multiple angles, such that the information collected by the apparatus for information collection is richer, and an unloading or loading mode of the unmanned forklift can be adjusted according to the information collected, thereby improving an unloading or loading efficiency. In the embodiments, the apparatus 10 for information collection only has a function of rotating and adjusting an angle, but does not have a function of lifting and adjusting a height. Therefore, for a scenario in which information collection requirements can be met only by adjusting an angle of the information collection body 100, such as loading/unloading of a small-sized truck, the apparatus 10 for information collection in the embodiments of the present disclosure not only meets collection requirements for the information of the parking poses of the truck and the poses of the cargo, but also facilitates mounting and reduces usage costs.

In other embodiments, reference can be made to FIG. 1 to FIG. 3. An apparatus 10 for information collection is provided in embodiments of the present disclosure, and the apparatus 10 for information collection is used in a process of cargo transfer. The process of cargo transfer includes unloading and loading of cargos. The apparatus 10 for information collection includes an information collecting body 100, a first adjusting mechanism 200, and a second adjusting mechanism 300. The information collecting body 100 is configured to collect information of a cargo and/or a truck to identify and locate the cargo and/or the truck. The information collecting body 100 is mounted at the first adjusting mechanism 200. The first adjusting mechanism 200 is configured to drive the information collecting body 100 to rotate around axis a. The first adjusting mechanism 200 is mounted at the second adjusting mechanism 300. The second adjusting mechanism 300 is configured to drive the first adjusting mechanism 200 to move back and forth in first direction z. Axis a (with reference to a left-right direction illustrated in FIG. 4 and FIG. 5 later) is perpendicular to first direction z (i.e., an up-down direction illustrated in FIG. 1 to FIG. 3). In this way, the second adjusting mechanism 300 is configured to drive the information collecting body 100 to move up and down in first direction z.

In the apparatus 10 for information collection, by disposing the information collecting body 100, the information of the cargo and/or the truck can be collected. By disposing the first adjusting mechanism 200, an angle of the information collecting body 100 can be adjusted. By disposing the second adjusting mechanism 300, a position of the information collecting body 100 in the first direction can be adjusted. Therefore, by comprehensively adjusting the angle of the information collecting body 100 and the position of the information collecting body 100 in the first direction, information of different parking poses of the truck and different poses of the cargo can be collected, such that an unmanned forklift can adjust an unloading or loading mode according to the information collected, thereby improving an unloading or loading efficiency.

It should be noted that "the information of the cargo and/or the truck" may include information such as appearance of the truck, coordinate information of the truck, appearance of the cargo and coordinate information of the cargo, etc. The truck carries the cargo. The truck includes a wing opening van, a flatbed truck, etc. The cargo includes a storage cage, a pallet and other carriers, and materials carried. Other information that needs to be collected, such as information of a truck parking area, can also be obtained according to actual usage requirements, which is not specifically limited in embodiments of the present disclosure.

Figure 4:
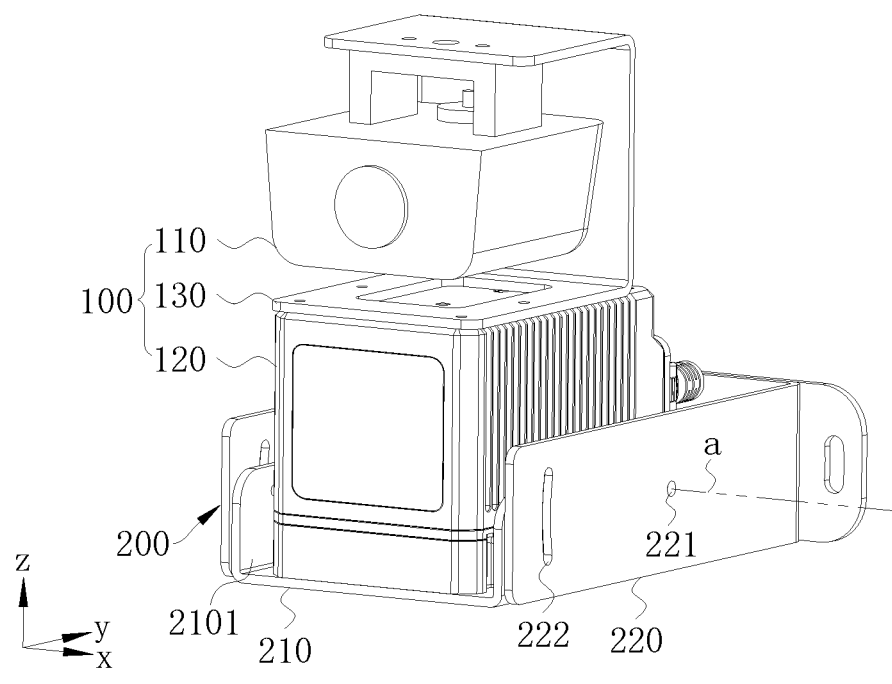
FIG. 4 is a schematic structural diagram illustrating a match between an information collecting body and a first adjusting mechanism from one perspective in an implementation of the present disclosure.
Figure 5:
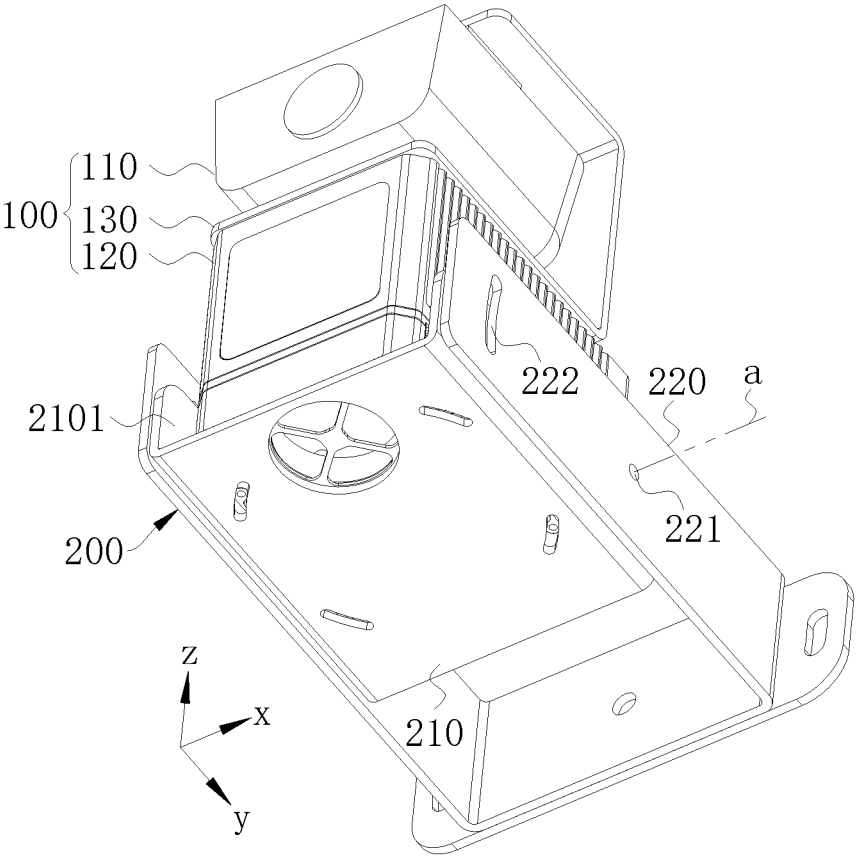
FIG. 5 is a schematic structural diagram illustrating a match between an information collecting body and a first adjusting mechanism from another perspective in an implementation of the present disclosure.

Reference can be made to FIG. 4 and FIG. 5, where FIG. 4 is a schematic structural diagram illustrating a match between an information collecting body 100 and a first adjusting mechanism 200 from one perspective in an implementation of the present disclosure, and FIG. 5 is a schematic structural diagram illustrating a match between an information collecting body 100 and a first adjusting mechanism 200 from another perspective in an implementation of the present disclosure. For convenience of explanation, only parts related to embodiments of the present disclosure are illustrated.

Reference can be made to FIG. 4 and FIG. 5, and by disposing the first adjusting mechanism 200, an angle of the information collecting body 100 can be adjusted. As illustrated in FIG. 1 to FIG. 3, by disposing the second adjusting mechanism 300, the first adjusting mechanism 200 can be driven to move back and forth in first direction z, and the first adjusting mechanism 200 can drive the information collecting body 100 to move back and forth in first direction z. Therefore, by comprehensively adjusting the angle of the information collecting body 100 and the position of the information collecting body 100 in first direction z, information of different parking poses of the truck and different poses of the cargo can be collected, such that an unmanned forklift can adjust a pickup mode according to the information collected, thereby improving an unloading efficiency.

It should be noted that the pickup mode includes a pickup path, a fork inserting direction for pickup, a pickup order, etc., which can be adjusted according to actual usage situations and not be limited in embodiments of the present disclosure.

Figures 6, 7:
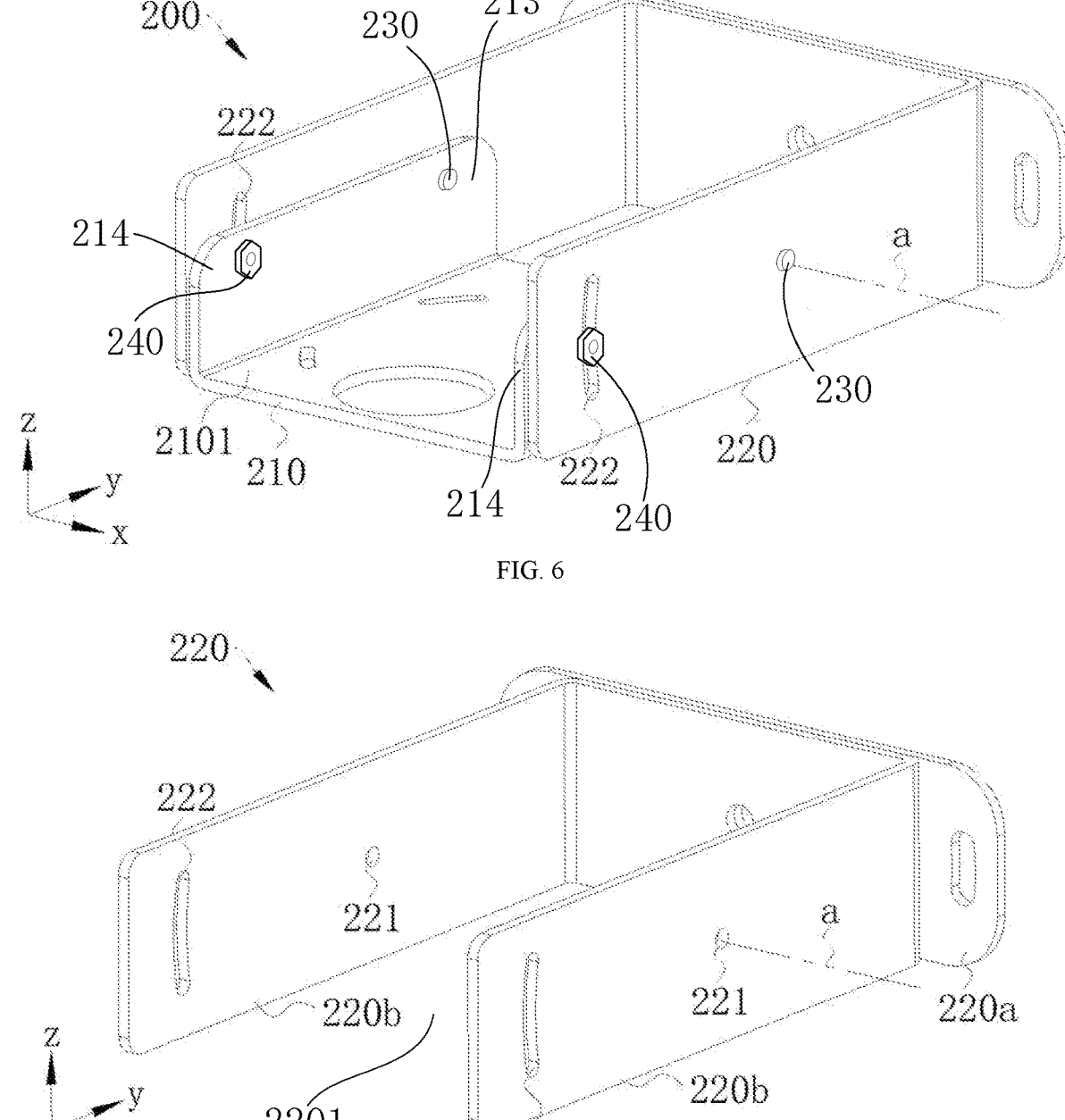
FIG. 6 is a schematic structural diagram of a first adjusting mechanism from one perspective in an implementation of the present disclosure.
FIG. 7 is a schematic structural diagram of a second mounting member in an implementation of the present disclosure.
Figure 8:
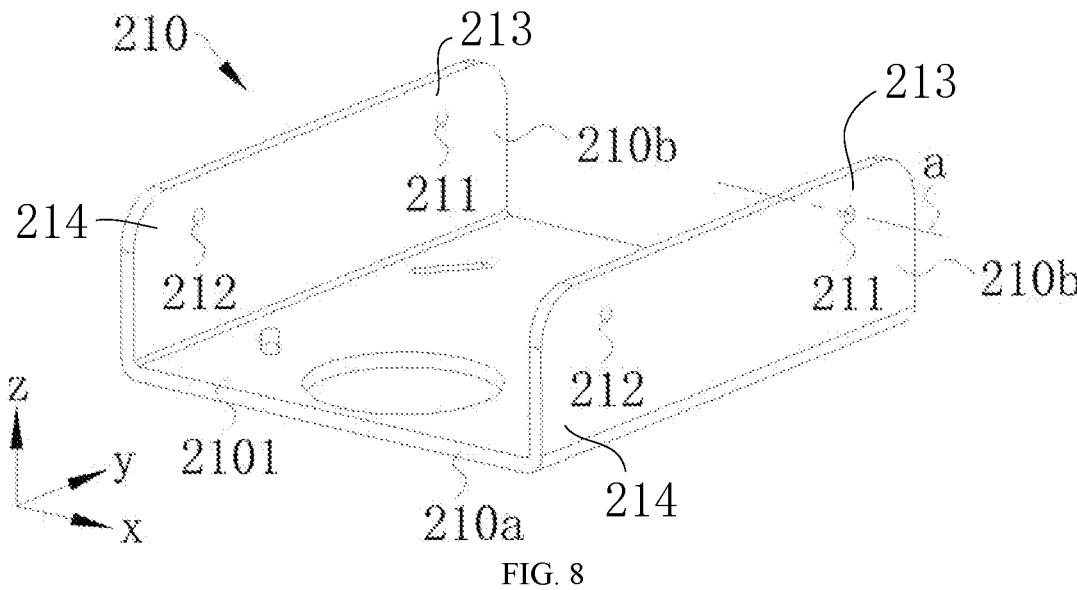
FIG. 8 is a schematic structural diagram of a first mounting member in an implementation of the present disclosure.
Figure 9:
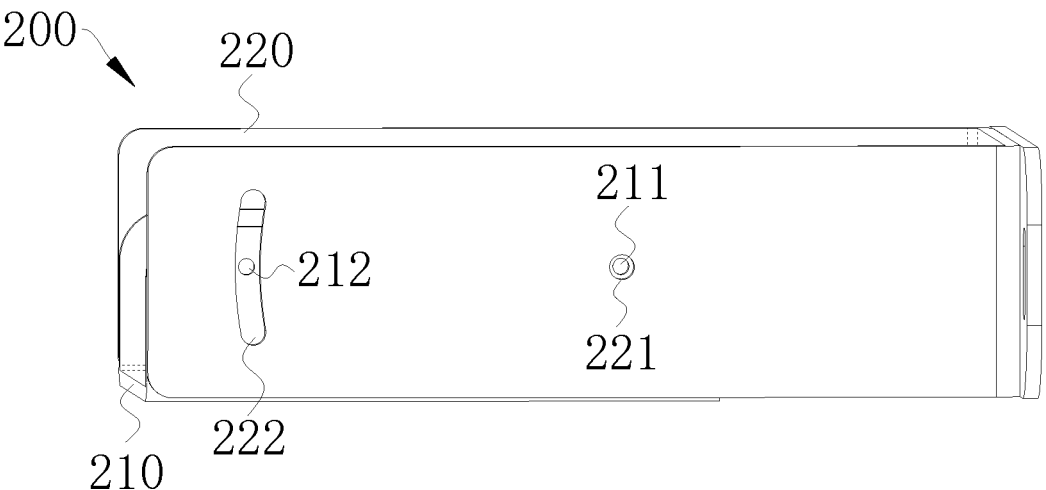
FIG. 9 is a schematic structural diagram of a first adjusting mechanism from another perspective in an implementation of the present disclosure.

Reference can be made to FIG. 6 to FIG. 9, where FIG. 6 is a schematic structural diagram of a first adjusting mechanism 200 from one perspective in an implementation of the present disclosure, FIG. 7 is a schematic structural diagram of a second mounting member 220 in an implementation of the present disclosure, FIG. 8 is a schematic structural diagram of a first mounting member 210 in an implementation of the present disclosure, and FIG. 9 is a schematic structural diagram of a first adjusting mechanism 200 from another perspective in an implementation of the present disclosure. For convenience of explanation, only parts related to embodiments of the present disclosure are illustrated.

In order to further facilitate adjustment of the first adjusting mechanism 200, in some embodiments, reference can be made to FIG. 6 to FIG. 9 in conjunction with FIG. 4 and FIG. 5, and the first adjusting mechanism 200 includes a first mounting member 210 and a second mounting member 220. The information collecting body 100 is mounted at the first mounting member 210. The second mounting member 220 connects to the second adjusting mechanism 300. The first mounting member 210 has a first end 213 and a second end 214 opposite to the first end 213 in second direction y. The first end 213 is close to the second adjusting mechanism 300, and the second end 214 is away from the second adjusting mechanism 300. The first end 213 of the first mounting member 210 is rotatably connected with the second mounting member 220 around axis a. The second end 214 of the first mounting member 210 is detachably fixed to the second mounting member 220. Second direction y is perpendicular to axis a. In other words, first direction z, second direction y, and axis a are perpendicular to each other. Axis a is parallel to third direction x illustrated in schematic diagrams. When the angle of the information collecting body 100 needs to be adjusted, fixing between the second end 214 of the first mounting member 210 and the second mounting member 220 can be relieved first, and then the first end 213 of the first mounting member 210 is driven to rotate relative to the second mounting member 220 around axis a. When the angle of the information collecting body 100 is adjusted to an angle required by a user through the first mounting member 210, the second end 214 of the first mounting member 210 is fixedly connected with the second mounting member 220 to lock the angle of the information collecting body 100.

Reference can continue to be made to FIG. 6 to FIG. 9. Specifically, in some embodiments, the first adjusting mechanism 200 further includes a first connecting member 230. The first end 213 of the first mounting member 210 defines a first connecting hole 211, and the second mounting member 220 defines a second connecting hole 221 corresponding to the first connecting hole 211. The first connecting member 230 passes through the first connecting hole 211 and the second connecting hole 221. The first end 213 of the first mounting member 210 is rotatably connected with the second mounting member 220 through the first connecting member 230. In other words, the first connecting member 230, the first connecting hole 211, and the second connecting hole 221 form a rotating-shaft structure. The first connecting member 230 may have a rod-like structure. When the first connecting member 230 passes through the first connecting hole 211 and the second connecting hole 221, a longitudinal extension direction of the first connecting member 230 is parallel to axis a. Therefore, the first end 213 of the first mounting member 210 can be rotatably connected with the second mounting member 220 around axis a.

Figure 10:
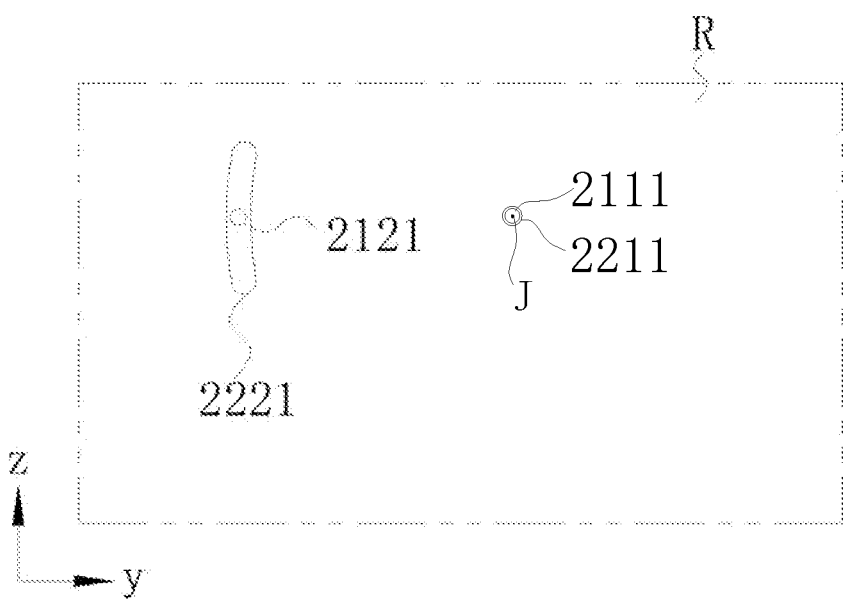
FIG. 10 is a schematic diagram of a first projection, a second projection, a third projection, and a fourth projection in an implementation of the present disclosure.

Reference can be made to FIG. 10, which is a schematic diagram of a first projection 2121, a second projection 2221, a third projection 2111, and a fourth projection 2211 in an implementation of the present disclosure. For convenience of explanation, only parts related to embodiments of the present disclosure are illustrated.

Reference can continue to be made to FIG. 6 to FIG. 9. Specifically, in some embodiments, the first adjusting mechanism 200 further includes a second connecting member 240. The second end 214 of the first mounting member 210 defines a third connecting hole 212, and the second mounting member 220 defines a fourth connecting hole 222 corresponding to the third connecting hole 212. The second connecting member 240 detachably passes through the third connecting hole 212 and the fourth connecting hole 222. The second end 214 of the first mounting member 210 is detachably and fixedly connected with the second mounting member 220 through the second connecting member 240. The second connecting member 240 may have a bolt structure or other detachable and fixed structures, which is not specifically limited in embodiments of the present disclosure. As illustrated in FIG. 10, during rotation of the first mounting member 210, an orthographic projection of the third connecting hole 212 on reference plane R is a first projection 2121, an orthographic projection of the fourth connecting hole 222 on reference plane R is a second projection 2221, and the first projection 2121 partially overlaps the second projection 2221, where reference plane R is a plane perpendicular to axis a. Specifically, the second projection 2221 is circular arc-shaped. More specifically, the first projection 2121 always falls within a range of the second projection 2221. For example, as illustrated in FIG. 10, the first projection 2121 is circular, the second projection 2221 is circular arc-shaped, the first projection 2121 falls within the second projection 2221, and a center of the second projection 2221 is intersection J of axis a and reference plane R. In other words, the fourth connecting hole 222 extends in a circular arc shape centered at the center of the second connecting hole 221, which is convenient to match a rotation path of the first mounting member 210, and is convenient to adjust the first mounting member 210.

Reference can continue to be made to FIG. 8 in conjunction with FIG. 4 to FIG. 6. In some embodiments, the first mounting member 210 defines a mounting groove 2101 for mounting the information collecting body 100, which facilitates mounting of the information collecting body 100. Specifically, in some embodiments, the first mounting member 210 has a bottom wall 210a and two first side walls 210b. The two first side walls 210b are disposed at two opposite ends of the bottom wall 210a in third direction x. The bottom wall 210a and the two first side walls 210b cooperatively define the mounting groove 2101. The two first side walls 210b each can define the first connecting hole 211 and the third connecting hole 212. For example, in FIG. 8, each first side wall 210b defines one first connecting hole 211 and one third connecting hole 212. In other words, the first mounting member 210 defines two first connecting holes 211 and two third connecting holes 212. The first mounting member 210 with other structural forms of the mounting groove 2101 may also be provided, which is not specifically limited in embodiments of the present disclosure.

Reference can continue to be made to FIG. 7 in conjunction with FIG. 6 and FIG. 8. Specifically, in some embodiments, the second mounting member 220 includes a second side wall 220*a* and two third side walls 220*b*. The two third side walls 220*b* are disposed at two opposite ends of the second side wall 220*a* in third direction x. The two third side walls 220*b* each can be defined the second connecting hole 221 and the fourth connecting hole 222. For example, in FIG. 7, each third side wall 220*b* defines one second connecting hole 221 and one fourth connecting hole 222. In other words, the second mounting member 220 defines two second connecting holes 221 and two fourth connecting holes 222. The two third side walls 220*b* of the second mounting member 220 are in one-to-one correspondence with the two first side walls 210*b* of the first mounting member 210. The second side wall 220*a* is disposed at one side of the mounting groove 2101 close to the second adjusting mechanism 300. In other words, the second side wall 220*a* and the two third side walls 220*b* cooperatively define an accommodating space 2201, and the first mounting member 210 is received in the accommodating space 2201. Therefore, as for the first adjusting mechanism 200, the first mounting member 210 matches the second mounting member 220 through two first connecting members 230 and two second connecting members 240. The second mounting member 220 in other structural forms matching the first mounting member 210 may also be disposed, which is not specifically limited in embodiments of the present disclosure.

Reference can continue to be made to FIG. 10. For convenience of explanation, only related parts of embodiments of the present disclosure are illustrated. As illustrated in FIG. 10, an orthographic projection of the third connecting hole 212 on reference plane R is a first projection 2121, an orthographic projection of the fourth connecting hole 222 on reference plane R is a second projection 2221, an orthographic projection of the first connecting hole 211 on reference plane R is a third projection 2111, and an orthographic projection of the second connecting hole 221 on reference plane R is a fourth projection 2211. Two first projections 2121 of the two third connecting holes 212 completely overlap with each other, and two second projections 2221 of the two fourth connecting holes 222 completely overlap with each other, two third projections 2111 of the two first connecting holes 211 completely overlap with each other, and two fourth projections 2211 of the two second connecting holes 221 completely overlap with each other, where reference plane R is a plane perpendicular to axis a. Therefore, the two first connecting members 230 can be ensured to extend in the same direction, where each of the two first connecting members 230 passes through the first side wall 210*b* and the third side wall 220*b*. Similarly, the two second connecting members 240 can be ensured to extend in the same direction, where each of the two second connecting members 240 detachably passes through the first side wall 210*b* and the third side wall 220*b*, thereby ensuring that the first mounting member 210 smoothly rotates relative to the second mounting member 220.

Reference can be made to FIG. 1 to FIG. 3. In some embodiments, the second adjusting mechanism 300 includes a third mounting member 310 and a guiding member 320. The first adjusting mechanism 200 is mount at the third mounting member 310, and the third mounting member 310 is slidably connected with the guiding member 320 in first direction z. When a position of the information collecting body 100 in first direction z needs to be adjusted, the third mounting member 310 can be driven to slide along the guiding member 320 in first direction z. When the position of the information collecting body 100 in first direction z is adjusted to a position required by a user through the third mounting member 310, the third mounting member 310 is stopped, to lock the position of the information collecting body 100 in first direction z.

Specifically, in some embodiments, the guiding member 320 may be a guide rail or a linear module. The guiding member 320 may also be in other structural forms such as a guide groove, which is not specifically limited in embodiments of the present disclosure. Specifically, in other embodiments, the second side wall 220*a* of the second mounting member 220 illustrated in some of the above embodiments can be fixedly connected with the second adjusting mechanism 300. Specifically, the second side wall 220*a* of the second mounting member 220 can be fixedly connected with the third mounting member 310 of the second adjusting mechanism 300. Therefore, by providing a match structure formed by the third mounting member 310 and the guiding member 320, the position of the information collecting body 100 in first direction z is convenient to be adjusted.

Reference can continue to be made to FIG. 4 and FIG. 5, and the information collecting body 100 includes a camera 110 and a laser sensor 120 connected with the camera 110. The camera 110 is configured to collect image information of the cargo and/or the truck. Optionally, the camera 110 may be an infrared camera. More specifically, the camera 110 may be a two-dimensional (2D) camera or a three-dimensional (3D) camera. The 2D camera is configured to collect 2D image information of the cargo and/or the truck. The 3D camera is configured to collect 3D image information of the cargo and/or the truck. The laser sensor 120 is configured to collect point-cloud information of the cargo and/or the truck. Specifically, the laser sensor 120 may be a 2D laser sensor or a 3D laser sensor. The 2D laser sensor is configured to collect 2D point-cloud information of the cargo and/or the truck. The 3D laser sensor is configured to collect 3D point-cloud information of the cargo and/or the truck. Therefore, the camera 110 and the laser sensor 120 are mounted and used in an integrated manner, so as to comprehensively collect the image information and the point-cloud information of the cargo and/or the truck, such that the cargo and/or the truck is identified and located more accurately.

Specifically, in some embodiments, the camera 110 may be connected with the laser sensor 120 through a bracket 130, such that a certain gap is defined between the camera 110 and the laser sensor 120. For example, as illustrated in FIG. 4, the camera 110 is disposed above the laser sensor 120. Specifically, in other embodiments, the laser sensor 120 may be a laser sensor with a heat dissipation structure. Optionally, the heat dissipation structure may be a fan structure. Here, the bottom wall 210*a* of the first mounting member 210 illustrated in the above embodiments may define an opening corresponding to the fan structure, which facilitates heat dissipation of the information collecting body 100 as a whole.

Figure 11:
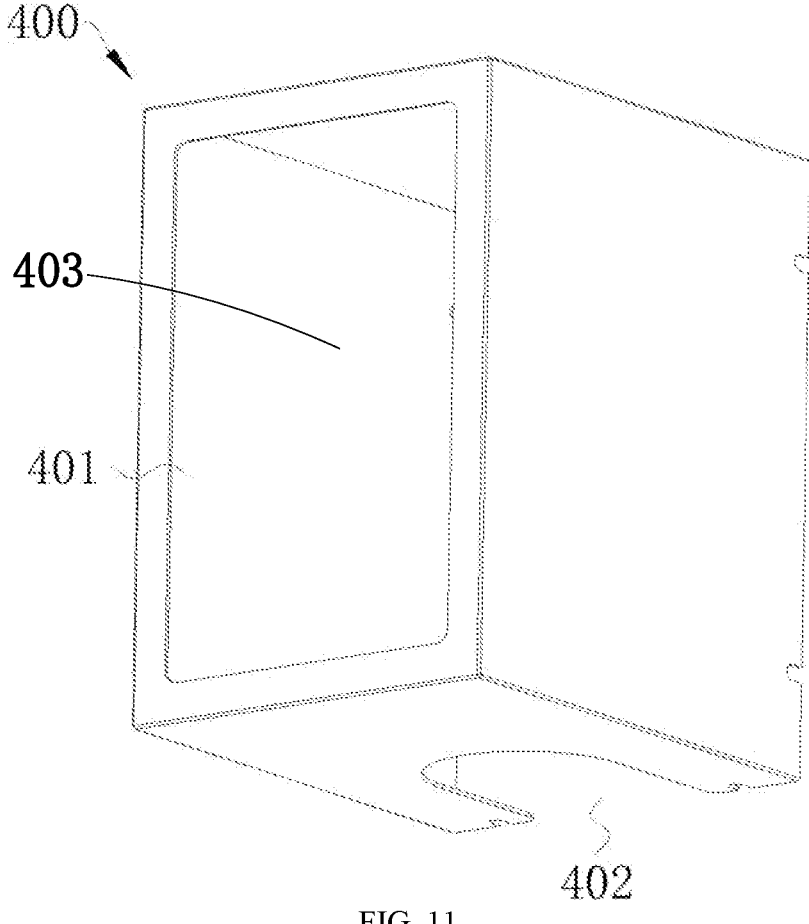
FIG. 11 is a schematic structural diagram of a housing in an implementation of the present disclosure.

FIG. 11 is a schematic structural diagram of a housing 400 in an implementation of the present disclosure. For convenience of explanation, only parts related to embodiments of the present disclosure are illustrated.

Reference can be made to FIG. 11 in conjunction with FIG. 1 to FIG. 3. In some embodiments, the apparatus 10 for information collection further includes a housing 400. The housing 400 is mounted at the second adjusting mechanism 300 and defines an accommodating cavity 403 for accommodating the information collecting body 100. Therefore, the information collecting body 100 can be protected. Specifically, the information collecting body 100 and the first adjusting mechanism 200 are accommodated in the accommodating cavity 403. Specifically, in some embodiments, the housing 400 defines a first opening 401, and the information collecting body 100 collects information of the cargo and/or the truck through the first opening 401. Specifically, the first opening 401 is defined on the housing 400 corresponding to an emitting surface of the laser sensor 120 and an operating surface of the camera 110, such that the camera 110 and the laser sensor 120 can collect information through the first opening 401. Specifically, in other embodiments, the third mounting member 310 illustrated in some of the above embodiments is provided with a connector 500, the housing 400 defines a second opening 402 for arrangement of wires, and the wires can be connected with the connector 500 after passing through the second opening 402. Therefore, operation of the information collecting body 100 is facilitated.

Figure 12:
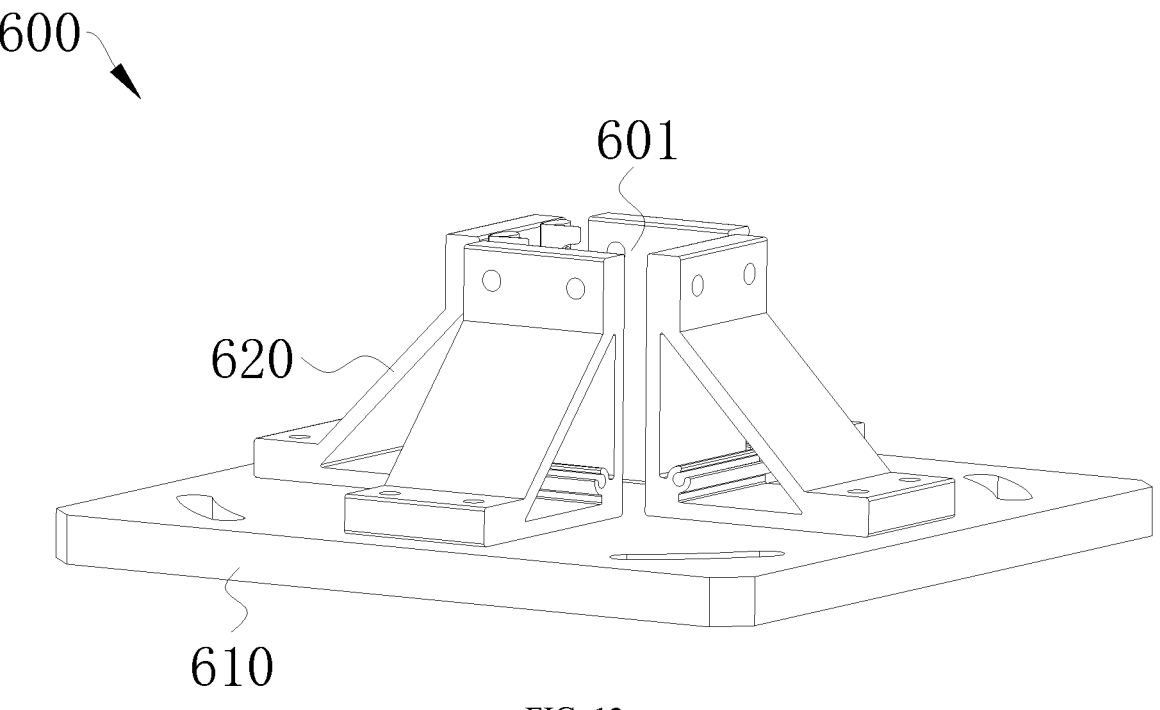
FIG. 12 is a schematic structural diagram of a mounting seat in an implementation of the present disclosure.

Reference can be made to FIG. 12, which is a schematic structural diagram of a mounting seat 600 in an implementation of the present disclosure. For convenience of explanation, only parts related to embodiments of the present disclosure are illustrated.

Reference can be made to FIG. 12 in conjunction with FIG. 1 to FIG. 3. In some embodiments, the apparatus 10 for information collection further includes a mounting seat 600. The second adjusting mechanism 300 is mounted at the mounting seat 600. For example, in FIG. 1 to FIG. 3, when first direction z is an up-down direction, the guiding member 320 of the second adjusting mechanism 300 is placed vertically, and a bottom end of the guiding member 320 can be inserted into the mounting seat 600 to realize stable placement on a desired flat surface (such as the ground, etc.). Specifically, in some embodiments, the mounting seat 600 includes a mounting baseplate 610 and multiple support members 620 disposed on the mounting baseplate 610. The multiple support members 620 cooperatively define a mounting space 601, and the second adjusting mechanism 300 is inserted into the mounting space 601. Specifically, the bottom end of the guiding member 320 of the second adjusting mechanism 300 can be inserted into the mounting space 601. The multiple support members 620 can be detachably connected with the guiding member 320 and the mounting baseplate 610 respectively.

Figure 13:
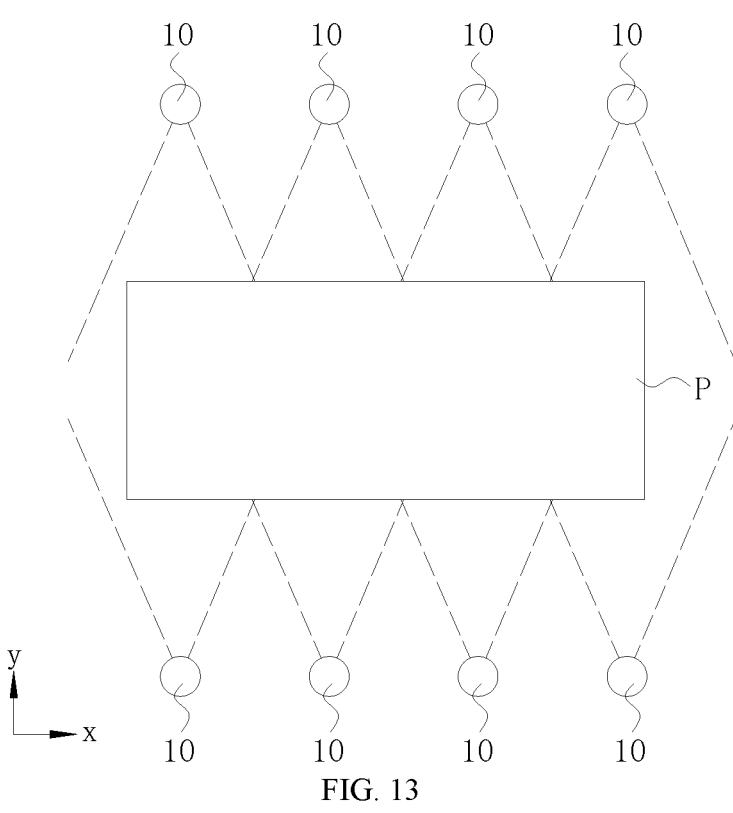
FIG. 13 is a schematic diagram illustrating an arrangement of multiple apparatuses for information collection in a monitoring system in an implementation of the present disclosure.

Reference can be made to FIG. 13, which is a schematic diagram illustrating an arrangement of multiple apparatuses 10 for information collection in a monitoring system in an implementation of the present disclosure. For convenience of explanation, only parts related to embodiments of the present disclosure are illustrated.

In embodiments of the present disclosure, a cargo handling method is provided in embodiments of the present disclosure. The method includes the following. Image information of a target object collecting is collected by a camera 110, and point-cloud information of the target object is collected by a laser sensor 120. The image information and the point-cloud information are fused to obtain a fusion result, and pose information of the target object is calculated according to the fusion result. The pose information fed back to a central control dispatching system to dispatch an unmanned forklift to unload or load.

In some embodiments, the target object includes a cargo and/or a truck. In terms of feeding back the pose information to the central control dispatching system to dispatch the unmanned forklift to unload or load, the method includes the following. A pickup priority is calculated according to pose information of the cargo and/or the truck. The pickup priority is fed back to the central control dispatching system to dispatch the unmanned forklift to unload.

In some embodiments, the target object includes a cargo location. In terms of calculating the pose information of the target object according to the fusion result, the method includes the following. A truck body of the truck is modelled according to the fusion result, to obtain size parameters of the truck body. According to the size parameters of the truck body, a region of interest and a loading plane are extracted, to calculate a pose of the cargo location. In the embodiments, the region of interest may be a region of the truck body that meets loading requirements.

In some embodiments, in terms of feeding back the pose information to the central control dispatching system to dispatch the unmanned forklift to unload or load, the method includes the following. Storage location-cargo location matching is performed through a storage-location configuration file, to return a matching result. The matching result is fed back to the central control dispatching system to dispatch the unmanned forklift to load. In the embodiments, the storage-location configuration file may be a data file including storage-location information of a warehouse or a distribution center. The storage-location configuration file may be used to record information such as number, size, capacity, type, etc. of the storage location.

Based on the same inventive concept, a monitoring system is further provided in embodiments of the present disclosure. The monitor system includes the apparatus 10 for information collection in the above embodiments. In some embodiments, as illustrated in FIG. 13, multiple apparatuses 10 for information collection are arranged at intervals around truck parking area P (for example, at each of two opposite sides of truck parking area P).

It should be noted that a range in which the multiple apparatuses 10 for information collection can collect information can cover truck parking area P.

Figure 14:
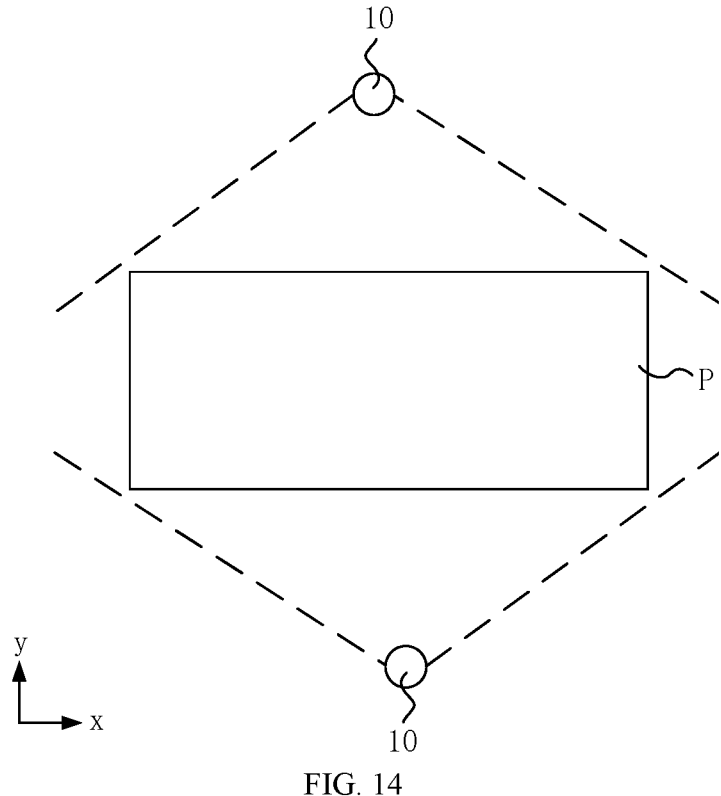
FIG. 14 is a schematic diagram illustrating an arrangement of multiple apparatuses for information collection in a monitoring system in another implementation of the present disclosure.

In other embodiments, at least one apparatus 10 for information collection is arranged around truck parking area P (for example, at each of two opposite sides of truck parking area P, at the top of truck parking area P, etc.). For example, reference can be made to FIG. 14, which illustrates another arrangement of multiple apparatuses 10 for information collection. Two apparatuses 10 for information collection are arranged around truck parking area P.

A principle for setting a position of the apparatus 10 for information collection is that collection field of view of the apparatus 10 for information collection cannot be blocked by a truck. The truck may be a closed container truck with an openable tail, a wing opening truck with two openable sides, a gooseneck truck with two open sides, etc. For the closed container truck with the openable tail, the apparatus 10 for information collection can be mounted at a side of truck parking area P facing a tail part of the container truck. For a closed truck with two openable sides, such as a wing opening truck, the apparatus 10 for information collection is preferably mounted at two sides of truck parking area P. When the apparatus 10 for information collection is mounted at the two sides of truck parking area P, the collection field of view of the apparatus 10 for information collection will not be blocked by two wings of the wing opening truck. However, when the apparatus 10 for information collection is mounted at the top of truck parking area P, the collection field of view of the apparatus 10 for information collection will be blocked by the two wings of the wing opening truck. For a truck with two open sides, such as a gooseneck truck, since the top of the gooseneck truck is hollow, the apparatus 10 for information collection may be mounted at the top or two sides of truck parking area P.

For example, on condition that there is a rain shed in a field operation, space at two sides of truck parking area P is not enough, and the truck is not a wing opening truck, at least one apparatus 10 for information collection may be mounted at the top of truck parking area P when the top of the truck is hollow.

Therefore, due to an arrangement of the above adjustable apparatus 10 for information collection, in scenarios such as truck unloading, the monitoring system can better obtain the information of the cargo and/or the truck to determine the pickup mode of the unmanned forklift. Further, the unmanned forklift can be operated according to the pickup mode, which solves problems that the unmanned forklift cannot pick up the cargo in a fixed path, cannot determine a fork inserting direction for pickup and a pickup order, and the like due to changeable parking poses of the truck and poses of the cargo on the truck, thereby improving an operating efficiency.

To sum up, in the apparatus 10 for information collection provided in embodiments of the present disclosure, the camera 110 and the laser sensor 120 are integrated into the information collecting body 100, such that the information of the cargo and/or the truck can be better collected, so as to locate the truck or the cargo according to the information. By disposing the first adjusting mechanism 200, the angle of the information collecting body 100 can be adjusted. Therefore, the apparatus 10 for information collection can collect the information of parking poses of the truck and poses of the cargo from multiple angles, such that the information collected by the apparatus 10 for information collection is richer, and the unloading or loading mode of the unmanned forklift can be adjusted according to the information collected, thereby improving the unloading or loading efficiency. The apparatus 10 for information collection provided in embodiments of the present disclosure basically has no requirements on the parking poses of the truck and the poses of the cargo, so the apparatus 10 for information collection cannot only be applicable to an unloading scene of a general truck, but also applicable to an unloading scene of a truck such as a wing opening truck, a flatbed truck, and the like, thereby improving the operating efficiency as a whole.

The technical features in the above embodiments can be combined in any manner. In an effort to provide a concise description, not all of the possible combinations of the technical features in the above embodiments are described. However, any combination of these technical features should be considered within the scope as recited in this specification unless there is a contradiction in such a combination.

The above embodiments only show several embodiments of the present disclosure, and the descriptions thereof are relatively specific and detailed, but cannot be understood as a limitation to the scope of the present disclosure. It should be noted that for those of ordinary skill in the art, without departing from the concept of the present disclosure, several modifications and improvements can be made, and these all belong to the protection scope of the present disclosure. Therefore, the protection scope of the present disclosure shall be referred to the appended claims.

What is claimed is:

1. An apparatus for information collection comprising:
an information collecting body configured to collect information of a cargo and/or a truck;
a first adjusting mechanism, wherein the information collecting body is mounted at the first adjusting mechanism, and the first adjusting mechanism is configured to drive the information collecting body to rotate around an axis; and
a second adjusting mechanism, wherein the first adjusting mechanism is mounted at the second adjusting mechanism, and the second adjusting mechanism is configured to drive the first adjusting mechanism to move back and forth in a first direction;
wherein the first adjusting mechanism comprises a first mounting member and a second mounting member;
the information collecting body is mounted at the first mounting member, and the second mounting member is connected to the second adjusting mechanism; and
the first mounting member has a first end and a second end opposite to the first end in a second direction, the first end is rotatably connected with the second mounting member around the axis, and the second end is detachably fixed to the second mounting member, wherein the axis, the first direction, and the second direction are perpendicular to one another.

2. The apparatus for information collection of claim 1, wherein the first adjusting mechanism further comprises a first connecting member;
the first end defines a first connecting hole, and the second mounting member defines a second connecting hole corresponding to the first connecting hole; and
the first connecting member passes through the first connecting hole and the second connecting hole, and the first end is rotatably connected with the second mounting member through the first connecting member.

3. The apparatus for information collection of claim 1, wherein the first adjusting mechanism further comprises a second connecting member;
the second end defines a third connecting hole, and the second mounting member defines a fourth connecting hole corresponding to the third connecting hole; and
the second connecting member detachably passes through the third connecting hole and the fourth connecting hole, and the second end is detachably and fixedly connected with the second mounting member through the second connecting member, wherein
an orthographic projection of the third connecting hole on a reference plane is a first projection, an orthographic projection of the fourth connecting hole on the reference plane is a second projection, and during rotation of the first mounting member, the first projection always partially overlaps the second projection, wherein the reference plane is a plane perpendicular to the axis.

4. The apparatus for information collection of claim 1, wherein the first mounting member defines a mounting groove for mounting the information collecting body.

5. The apparatus for information collection of claim 1, wherein the first mounting member has a bottom wall and two first side walls, the two first side walls are disposed at two opposite ends of the bottom wall along the axis, the bottom wall and the two first side walls cooperatively define a mounting groove, and the information collecting body is mounted in the mounting groove; and the second mounting member has a second side wall and two third side walls, the two third side walls are disposed at two opposite ends of the second side wall along the axis, the second side wall and the two third side walls cooperatively define an accommodating space, and the first mounting member is received in the accommodating space.

6. The apparatus for information collection of claim 5, wherein the two first side walls each define a first connecting hole and a third connecting hole in the second direction; and the two third side walls each define a second connecting hole corresponding to the first connecting hole and a fourth connecting hole corresponding to the third connecting hole in the second direction, wherein an orthographic projection of the third connecting hole on a reference plane is a first projection, an orthographic projection of the fourth connecting hole on the reference plane is a second projection, an orthographic projection of the first connecting hole on a reference plane is a third projection, an orthographic projection of the second connecting hole on the reference plane is a fourth projection, two first projections of two third connecting holes completely overlap with each other, two second projections of two fourth connecting holes completely overlap with each other, two third projections of two first connecting holes completely overlap with each other, two fourth projections of two second connecting holes completely overlap with each other, wherein the reference plane is a plane perpendicular to the axis.

7. The apparatus for information collection of claim 6, wherein the second side wall is fixedly connected with the second adjusting mechanism.

8. The apparatus for information collection of claim 1, wherein the second adjusting mechanism comprises a third mounting member and a guiding member; and the first adjusting mechanism is mounted at the third mounting member, and the third mounting member is slidably connected with the guiding member in the first direction.

9. The apparatus for information collection of claim 1, wherein the information collecting body comprises a camera and a laser sensor connected with the camera; and the camera is configured to collect image information of the cargo and/or the truck, and the laser sensor is configured to collect point-cloud information of the cargo and/or the truck.

10. The apparatus for information collection of claim 9, wherein the camera is a two-dimensional (2D) camera, and the 2D camera is configured to collect 2D image information of the cargo and/or the truck; or the camera is a three-dimensional (3D) camera, and the 3D camera is configured to collect 3D image information of the cargo and/or the truck.

11. The apparatus for information collection of claim 9, wherein the laser sensor is a 2D laser sensor, and the 2D laser sensor is configured to collect 2D point-cloud information of the cargo and/or the truck; or the laser sensor is a 3D laser sensor, and the 3D laser sensor is configured to collect 3D point-cloud information of the cargo and/or the truck.

12. The apparatus for information collection of claim 1, further comprising a housing, wherein the housing defines an accommodating cavity for accommodating the information collecting body.

13. A monitoring system comprising the apparatus for information collection of claim 1.

14. The monitoring system of claim 13, wherein at least one apparatus for information collection is arranged around a truck parking area.

* * * * *